Dec. 20, 1966   B. BROWN ETAL   3,292,483
ROLLER INSPECTION GAGE WITH TRANSPARENT
ROD AS ONE OF SUPPORT MEMBERS
Filed March 13, 1964   3 Sheets-Sheet 1
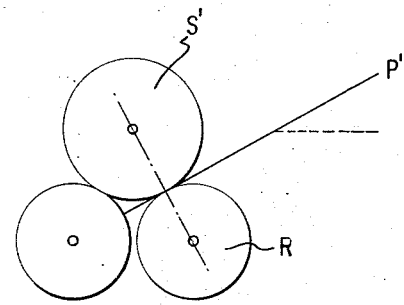
FIG. 1b
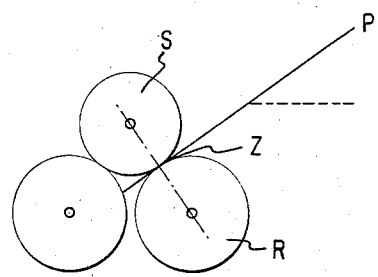
FIG. 1a
FIG. 2
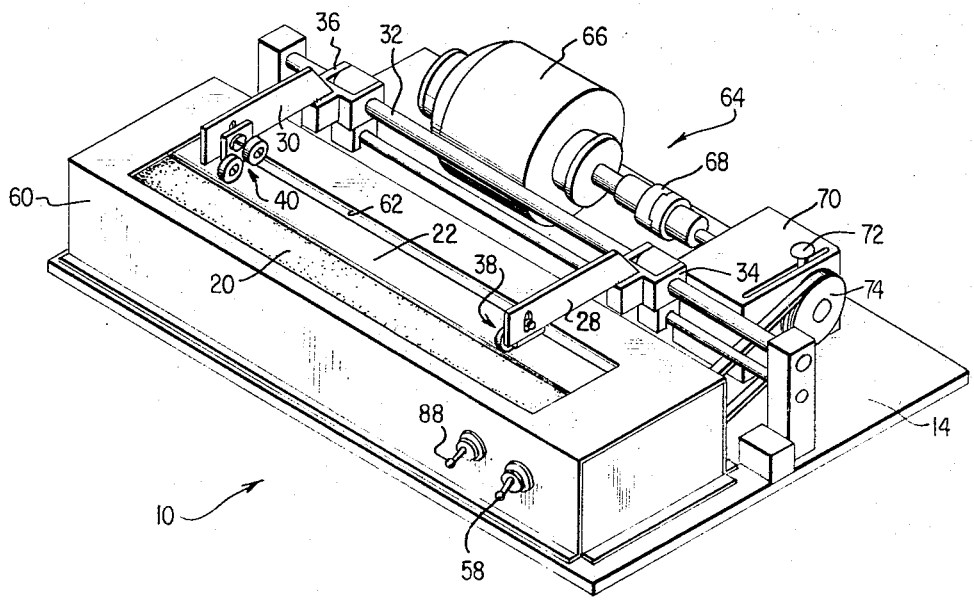
INVENTORS.
BERNARD BROWN
HERMAN R. BRANDT
BY Diggins & O'Boyle
ATTORNEYS.

INVENTORS.
BERNARD BROWN
HERMAN R. BRANDT

Dec. 20, 1966    B. BROWN ETAL    3,292,483
ROLLER INSPECTION GAGE WITH TRANSPARENT
ROD AS ONE OF SUPPORT MEMBERS
Filed March 13, 1964    3 Sheets-Sheet 3

INVENTORS.
BERNARD BROWN
HERMAN R. BRANDT
BY Diggins & O'Boyle
ATTORNEYS.

United States Patent Office 3,292,483
Patented Dec. 20, 1966

3,292,483
ROLLER INSPECTION GAGE WITH TRANSPARENT ROD AS ONE OF SUPPORT MEMBERS
Bernard Brown, Prospect Heights, and Herman R. Brandt, Chicago, Ill., assignors to A. B. Dick Company, Chicago, Ill., a corporation of Illinois
Filed Mar. 13, 1964, Ser. No. 351,597
7 Claims. (Cl. 88—14)

This invention relates to inspection gages generally, and more particularly to a novel roller inspection gage and method for providing a substantially instantaneous, accurate indication and identification of roller defects.

Precision ground rollers of widely varying diameters and lengths are presently being employed in many areas of industrial endeavor. For many applications, it is imperative that such precision ground rollers be free from even the most minute imperfections, many of which are invisible to the naked eye.

The need to achieve an accurate inspection of a precision ground roller has led to the development of numerous electrical and mechanical inspection gages of varying varieties. Although many of these previously developed gages are capable of providing an accurate inspection of a roller, many of such gages are not universal and will only provide an indication regarding a single type of roller defect. This limitation is often prevalent in previously known mechanical gages, which additionally are capable of inspecting only a small portion of roller surface at a given time. With these gages, an excessive time is required in order to completely inspect surface of a large roller.

In an attempt to overcome the inherent limitations of mechanical gaging units, electrical gaging units have been developed for the inspection of precision ground rollers. These electrical inspection gages are normally adapted to rapidly scan a roller under test and to provide an indication that a defect exists within a minimal inspection period. However, such electrical inspection units normally are not only delicate, but are also of a complexity beyond the comprehension of the average machine operator. Additionally, although these electrical inspection units often operate rapidly to indicate the existence of a defect, these units fail to indicate the exact location of such defect, thereby necessitating the additional expenditure of time required to locate the defect with mechanical gaging units.

Typical of known electrical gaging units are a variety of units employing light to scan a roller to be inspected. These scanning beams of light are received by strategically placed photocells which operate to provide an electrical indication when certain flaws or irregularities are detected in roller surface. Through the use of strategically placed light scanning units and photocell pickup units, it is possible to inspect a roller for concentricity, eccentricity, variations in diameter, and other similar features, However, such systems normally require a separate light projector and photocell for each roller feature to be inspected, and although such photocell inspection circuits do operate rapidly to scan a roller and provide an indication upon the occurrence of a defect, these normally complex circuits do not operate to indicate the location of such defect.

The increasing demands of industry for precision rollers has led to an attendant need for a simple but accurate roller inspection gage universally adaptable to rapidly indicate the existence of defects in rollers of various sizes. Ideally, such a roller inspection gage should also be adapted for use by the ordinary machine operator, and must not only provide a rapid and complete inspection of precision rollers of various sizes, but must also accurately locate any roller defects to eliminate the necessity of subsequent prolonged mechanical inspection.

The primary object of this invention is to provide a novel roller inspection gage of simple, durable construction.

Another object of this invention is to provide a novel roller inspection gage which is operable to completely and rapidly facilitate the inspection of rollers of varying diameters or lengths without requiring gage adjustments.

A further object of the invention is to provide a novel roller inspection gage which will visually indicate the exact location of defects present in a roller under inspection.

Another object of this invention is to provide a novel roller inspection gage embodying a novel light direction system which is operable without adjustment to direct a strong beam of light from a light source through an inspection zone regardless of angular variations in the plane of said inspection zone.

A still further object of this invention is to provide an improved method for locating and identifying in a single inspection operation various defects present in an object having an elongated arcuate surface.

The above and further objects and details of the invention will be readily apparent upon a consideration of the following specification taken with the accompanying drawings in which:

FIGURES 1a and 1b are diagrammatic illustrations showing the inspection zone formed by the roller inspection gage of the present invention;

FIGURE 2 is a perspective view of the roller inspection gage of the present invention;

Figure 3:
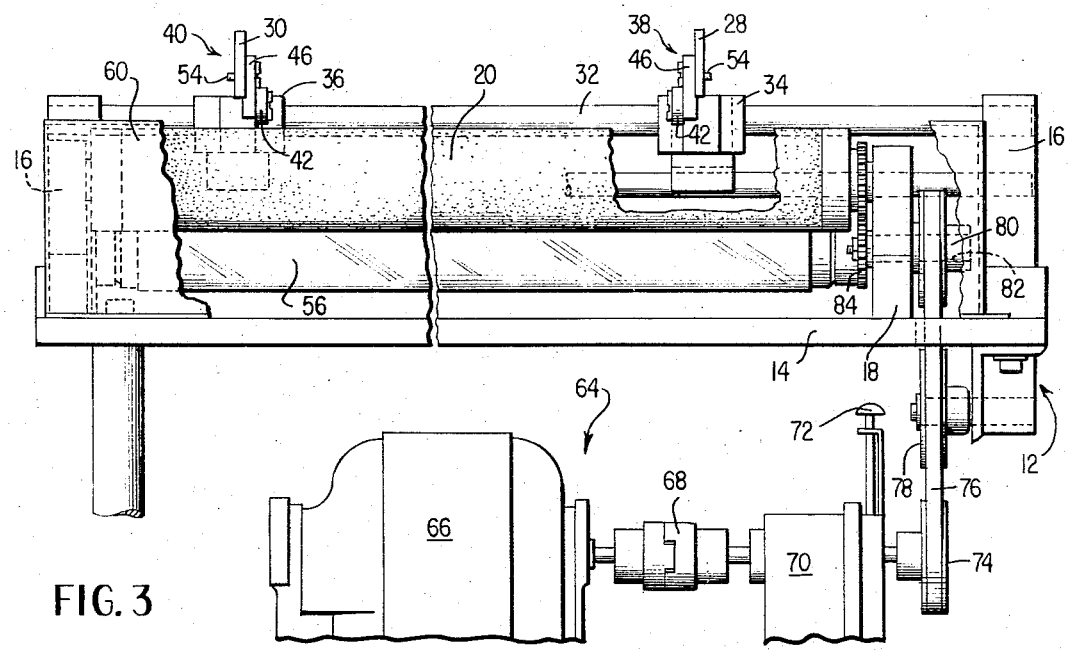
FIGURE 3 is a sectional view in front elevation of the roller gage of the present invention shown with the drive motor below the unit to illustrate the drive connection.

Basically, the roller inspection gage of the present invention consists of two motor-driven precision rollers mounted in parallel, spaced relationship. These rollers are perfectly concentric, of uniform diameter throughout their respective lengths, and free from surface imperfections. In the operation of the roller inspection gage, these spaced, parallel rollers are employed to support and rotate a specimen roller while a beam of light is directed against the contact line between one of the supporting rollers and the specimen roller to pinpoint defects in the specimen roller.

In these general respects, the roller inspection gage of the present invention does not differ radically from previously developed gages employing photocell circuits or mechanical gaging means to test the concentricity of a cylindrical object. However, previously known gages, many of which employ a light source and mechanical or optical means to direct and confine light within the area of an inspection zone, suffer from a lack of versatility which renders such gages impractical in actual usage. For example, with such gages it is impossible to sequentially complete a 100% inspection of a plurality of cylindrical rollers of varying sizes and rapidly identify and locate a variety of defects present in such rollers.

One obstacle to the achievement of a complete and rapid inspection of an elongated cylindrical roller and the location and identification of defects therein exists in the light projection systems employed in presently known inspection gages. To accomplish the complete inspection of an elongated roller in a minimum time, it is necessary to project an intense beam of light of substantially uniform intensity throughout an inspection zone of a length substantially equal to the length of the specimen roller. When, as in the inspection gage of the present invention, this inspection zone is formed by the contact line between the specimen roller and one of the supporting rollers and extends in a plane tangent to the specimen and supporting roller, it becomes extremely difficult to uniformly project sufficient light along the entire length of the inspection zone so that roller surface defects as small as .001 inch can be readily detected.

Also compounding the light projection problem which must be met if an elongated cylindrical surface is to be completely inspected in a single operation, is the need for a roller inspection gage which, while capable of accomplishing a rapid and complete inspection function, is also universal and adapted to sequentially receive a plurality of rollers of varying sizes without adjustment. As may best be observed with reference to FIGURES 1a and 1b, the point of contact between the support rollers and the specimen roller and the angular plane of the inspection zone formed thereby is a function of the size of the specimen roller. Thus the plane P of the inspection zone Z formed between the specimen roller S and the support roller R of FIGURE 1a, shifts to the plane P' when the larger specimen roller S' of FIGURE 1b is substituted for the specimen roller S.

With the angular plane of the inspection zone of a roller inspection gage constantly varying as rollers of various diameters are sequentially placed upon the support rollers for inspection, it becomes obvious that the highly directional light projection units presently employed in inspection gages cannot function without adjustment to uniformly illuminate the inspection zone with high intensity light during the inspection of rollers of varying sizes. Therefore, with known inspection gages, it would be necessary to adjust the existing light source or to substitute a new light source with each change of specimen roller size.

One of the primary features of the roller inspection gage of the present invention is the ability to facilitate the complete and rapid inspection of rollers of varying sizes without requiring the adjustment of a light projection system. The specific gage construction which makes this feature possible may best be understood with reference to FIGURES 2, 3 and 4 which illustrate in detail the construction of the roller inspection gage 10 of the present invention.

Figure 4:
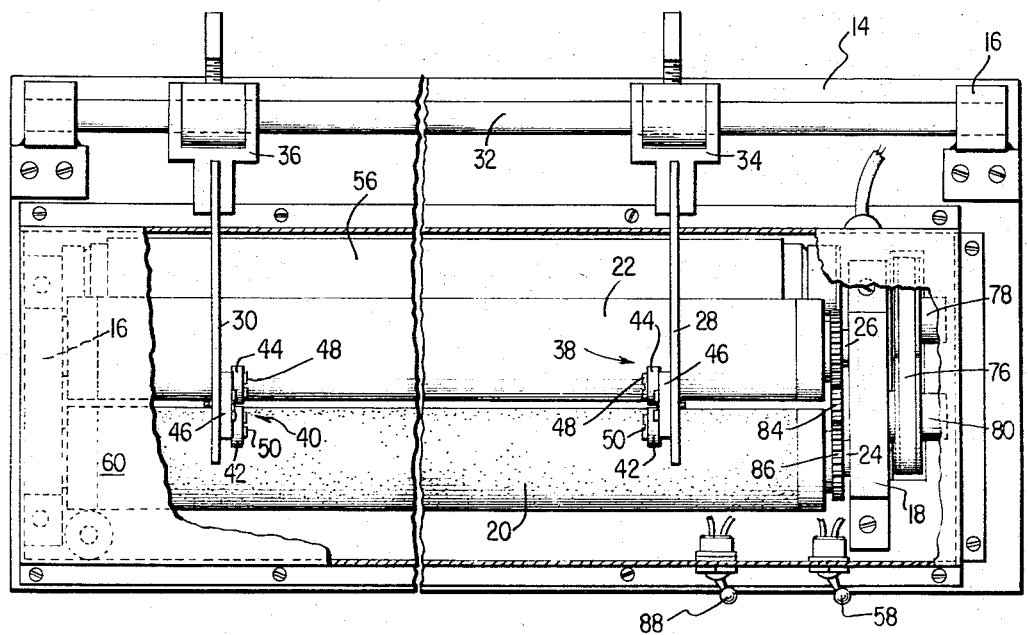
FIGURE 4 is a sectional plan view of the roller gage of the present invention.

Referring now to FIGURES 2, 3 and 4, the roller inspection gage 10 of the present invention includes a frame 12 having a horizontal base plate 14 and side frame members 16 extending vertically therefrom. Frame 12 additionally includes an inner frame member 18 which extends vertically from the base plate 14 inwardly and in spaced parallel relationship to one of the side frame members 16.

Two cylindrical rolls 20 and 22 are mounted between the inner frame member 18 and one of the side frame members 16 by means of shafts 24 and 26 which are journalled in bearings in the side frame member and inner frame member. Rollers 20 and 22 are precision rollers which are mounted precisely parallel to each other and are perfectly concentric, of uniform diameter throughout their respective lengths, and free from surface imperfections. The roller 20 constitutes a reference roller and is constructed of dark opaque material, as for example black nylon, while roller 22 is a transparent light transmitting roller which is formed from polymethyl methacrylate or other material having similar optical properties. Thus the light transmitting roller 22, which constitutes a transparent rod of polymethyl methacrylate (often identified by the trade names Lucite and Plexiglas), has light transmission and light emitting characteristics whereby light from an elongated light source placed parallel to such roller will be emitted with equal intensity at all points around the periphery of the roller.

A specimen roller support including two parallel support arms 28 and 30 is adjustably suspended above the rollers 20 and 22 by means of a transverse rod 32, the terminal ends of which are secured to the side frame members 16. One end of the support arms 28 and 30 is slidably mounted upon the transverse rod 32 by means of brackets 34 and 36, while the opposite end of the support arms maintains roller shaft supports 38 and 40 in a central position above and between the rollers 20 and 22. Roller shaft supports 38 and 40 include two bearing wheels 42 and 44 which are mounted for rotation upon a back plate 46. The bearing wheels 42 and 44 are of equal size, perfectly concentric, and are mounted for rotation about shafts 48 and 50 which extend in parallel relationship from the backing plate 46. Additionally, the bearing wheel shafts 48 and 50 of the roller shaft supports 38 and 40 are in exact alignment so that the bearing wheels 42 and 44 of the roller shaft supports 38 and 40 are caused to rotate about the same axis.

The roller shaft supports 38 and 40 are vertically adjustable relative to the support arms 28 and 30 by means of an adjustment bolt 52 which extends through the backing plate 46 and a vertical slot 54 in the support arms 28 and 30. Upon loosening the adjustment bolt 52, the backing plate 46 may be moved vertically relative to the support arm to position the bearing wheels 44 and 50 at a desired point above the rollers 20 and 22.

An elongated neon tube 56 constitutes the light source for the roller inspection gage 10 and is suitably mounted by means of brackets or other conventional means secured to the frame 12. Neon tube 56 is preferably of substantially the same length as the light transmitting roller 22, and is mounted parallel and adjacent the light transmitting roller. As illustrated in FIGURES 3 and 4, the neon tube 56 is mounted behind and below the light transmitting roller 22 by means of brackets secured to the base plate 14, but it is obvious that the neon tube 56 could be mounted at any suitable position about the periphery of the light transmitting roller 22.

The electrical circuitry for the neon tube 56 may be of any conventional type well known to the art, and is mounted upon the frame 12 by suitable mounting means. The energization circuit for the neon tube 56 may be connected through a switch 58 mounted upon the front portion of the frame 12, and the switch 58 may then be employed to manually control the energization of the neon tube 56.

To prevent ambient light in the vicinity of the roller inspection gage 10 from interfering with light from the light source 56, a housing 60 is mounted upon the frame 12 to enclose the rollers 20 and 22 and the neon tube 56. Housing 60 is of rectangular, box-like configuration and is provided with an elongated rectangular opening 62 in the top wall thereof to expose the rollers 20 and 22.

The base plate 14 of the frame 12 extends rearwardly beyond the housing 60 to provide a platform for a motor drive unit 64. Motor drive unit 64 includes an electric motor 66 of any suitable type which is connected by means of a clutch 68 to a speed control box 70, and motor 66 may be electrically energized by a conventional electrical supply circuit which is connected through an energization switch 88 mounted on the front portion of frame 12. Speed control box 70 may constitute any one of a number of known units for controlling the output speed of an electric motor, and includes a control arm 72 which may be variably positioned to cause the unit 70 to vary the output speed of a drive pulley 74 connected thereto. Output pulley 74 in turn furnishes power to drive a belt 76 which extends across an idler tensioning pulley 78 mounted upon the frame 12 to a roller drive pulley 80. Roller drive pulley 80 is mounted upon the inner frame member 18 by means of a shaft 82 which is secured to the roller drive pulley and extends through the inner frame member to a roller friction drive wheel 84. The roller friction drive wheel 84 in turn contacts friction wheels 86 and 88 which are secured to the roller shafts 24 and 26 of the rollers 20 and 22. It is obvious that the specific roller driving unit illustrated in FIGURES 2–4 may be replaced by any of a number of well known variable speed driving networks.

In operating the roller inspection gage 10 to accomplish the roller inspection method of the present invention, a specimen roller S, as illustrated in FIG. 1a, is placed upon the rollers 20 and 22 so that an inspection zone is formed at the contact point between the reference roller 20 and the specimen roller. The specimen roller may be solely supported by the rollers 20 and 22, or, if the specimen roller is provided with a roller shaft, the terminal ends of such shaft may be placed between the bearing wheels 42 and 44, and the back plates 46 may then be adjusted so that the specimen roller surface is in contact with the rollers 20 and 22.

Referring now to the diagrammatic representations of FIGS. 5a–h, some of the roller defects which may be identified through the use of the roller inspection method and apparatus of the present invention become readily apparent. From FIGS. 5a–h, it may be seen that the beam of light, indicated as a dark spot at 90, which passes between the reference roller 20 and the specimen roller S, indicates both the existence and location of a defect and aids in identifying such defects.

Referring now to FIGS. 5a–d, the light pattern which will be noted with a defective rubber roller when there is loose rubber not properly bonded to the roller shaft can be recognized. As the specimen roller rotates to the position illustrated in FIGS. 5a and b, a beam of light will appear at the central portion of the roller, but as the specimen roller rotates to the position illustrated in FIGS. 5c and d, the beam of light will alternately shift to the two outer extremities of the roller. This shifting of the light beam indicates to the operator that there is loose rubber on the roller shaft.

Figure 5A:
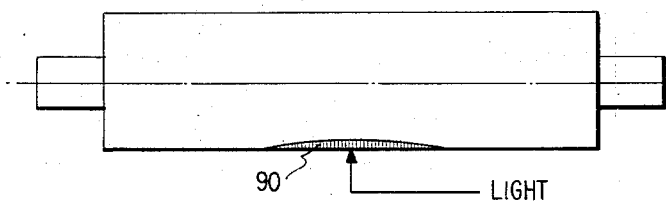
FIGURES 5a–h are diagrammatic representations illustrating various roller flaws identified by the roller inspection gage of the present invention.
Figure 5B:
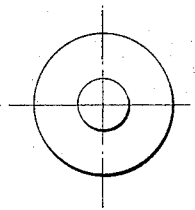
Figure 5C:
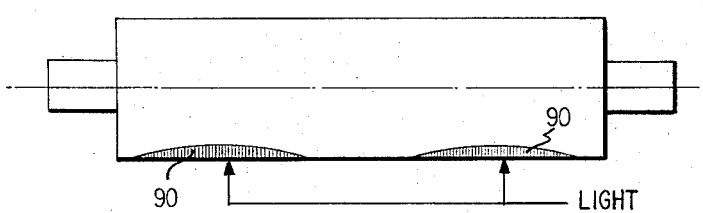
Figure 5D:
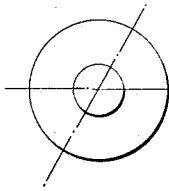
Figure 5E:
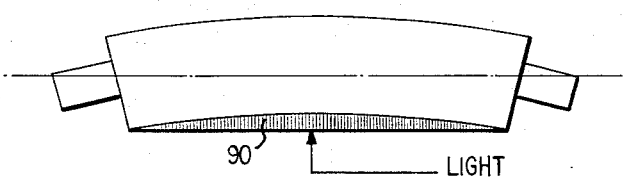

A bent roller shaft condition is illustrated by FIG. 5e. To determine whether this condition exists, the roller gage operator must place the terminal points of the specimen roller shaft in the roller shaft supports 38 and 40 before actuating the switches 58 and 88.

Figure 5F:
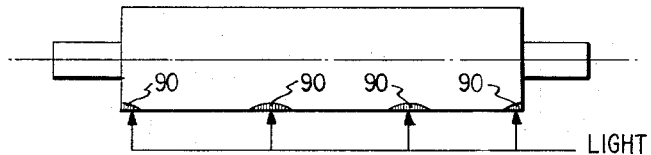
Figure 5G:
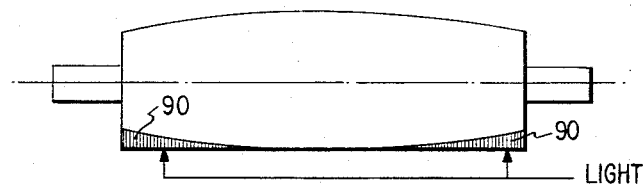
Figure 5H:
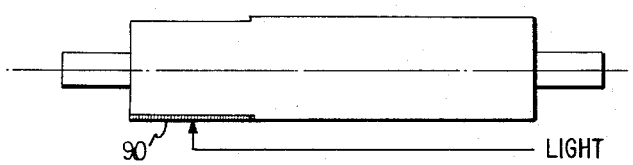

The roller defects indicated by FIG. 5f show the operator that a worn abrasive belt or back-up wheel loading is present in the roller grinder, while the defect configuration shown by FIGS. 5g and 5h identifies a worn back-up wheel in the roller grinding unit. Early indication of defects of this nature enable the operator to correct the condition present in the roller grinder to preclude the production of additional defective rollers.

Once a roller defect is noted in the inspection zone, it is possible for the inspection gage operator to amplify the light pattern produced by varying the speed of the roller drive unit 64. As the speed increases, the specimen roller tends to bounce slightly on the supporting rollers 20 and 22, thereby causing the light passing through the defect to appear with increased intensity.

It will be readily apparent to those skilled in the art that the present invention provides an improved method and roller inspection gage for rapidly achieving a 100% inspection of cylindrical rollers of various diameters for concentricity, parallelism, and surface imperfections. The roller inspection gage of the present invention is capable of accurately inspecting a wide range of cylinders, both in diameter and in length, without adjustment, and is adaptable to many areas of the industrial endeavor. The arrangement and types of components utilized within this invention may be subject to numerous modifications well within the purview of these inventors who intend only to be limited to a liberal interpretation of the specification and appended claims.

We claim:
1. An inspection gage for locating and facilitating the identification of defects in an object having an arcuate surface comprising reference means for contacting the arcuate surface of said object to form an inspection zone extending in a plane tangent to said arcuate surface at the contact line between said arcuate surface and reference means, said reference means being formed to obstruct the passage of light through said inspection zone in the absence of a defect in said object, a light source mounted within said gage on one side of said inspection zone, and transparent light transmission means mounted within said gage adjacent said inspection zone and light source and extending substantially parallel to the line of contact between said arcuate surface and reference means, said light transmission means having an optical form whereby the surface thereof adjacent said inspection zone is operable to transmit a direct beam of light of maximum intensity in the plane of said inspection zone regardless of angular variations in such plane.

2. The inspection gage of claim 1 wherein said reference means includes a dark, opaque surface for contact with the arcuate surface of said object, said dark opaque surface acting to minimize light reflection in said inspection zone.

3. The inspection gage of claim 1 including means for moving the arcuate surface of said object relative to said reference means.

4. The inspection gage of claim 1 wherein the surface of said light transmission means adjacent said inspection zone is arcuate in form.

5. A roller inspection gage for locating and facilitating the identification of defects in a cylindrical roller comprising a frame, a reference roller mounted for rotation upon said frame, said reference roller being free from defects and adapted to contact the surface of said cylindrical roller to form an inspection zone extending in a plane tangent to said reference and cylindrical rollers at the contact line therebetween, a light source mounted within such gage on one side of said inspection zone, transparent light-conducting roller means mounted for rotation upon said frame adjacent said light source in spaced, parallel relationship with said reference roller to cooperate with said reference roller in supporting said cylindrical roller therebetween, said transparent roller means operating to transmit a direct beam of light of maximum intensity in the plane of said inspection zone regardless of angular variations in such plane, and drive means mounted within said frame, said drive means being connected to cause relative rotation between said reference and cylindrical rollers and said light-transmitting roller means.

6. The roller inspection gage of claim 5 wherein said reference roller is provided with a dark opaque surface acting to minimize light reflection in said inspection zone.

7. A roller inspection gage for locating and facilitating the identification of defects in a cylindrical roller comprising a frame, an elongated reference roller mounted for rotation upon said frame, said reference roller including a dark, opaque, cylindrical surface adapted to contact the surface of said cylindrical roller to form an inspection zone extending in a plane tangent to said reference and cylindrical rollers at the contact line therebetween, an elongated light source mounted within said gage on one side of said inspection zone, an elongated light conducting roller of polymethyl methacrylate mounted for rotation upon said frame in spaced, parallel relationship with said reference roller and said light source, said light conducting roller being mounted to cooperate with said reference roller in supporting said cylindrical roller, and variable speed drive means mounted within said frame, said variable speed drive means being connected to cause rotation of said reference and light-conducting rollers.

References Cited by the Examiner
UNITED STATES PATENTS
2,393,705  1/1946  Olson et al. _____ 88—24

WALTER STOLWEIN, *Primary Examiner.*

RALPH G. NILSON, *Examiner.*

M. ABRAMSON, *Assistant Examiner.*